United States Patent
Gillard et al.

(10) Patent No.: US 11,254,777 B2
(45) Date of Patent: Feb. 22, 2022

(54) NITROGEN-CONTAINING MULTI-BLOCK COPOLYMERS AND METHOD OF MAKING

(71) Applicant: 3M INNOVATIVE PROPERTIES COMPANY, St. Paul, MN (US)

(72) Inventors: Timothy M. Gillard, St. Paul, MN (US); Carl A. Laskowski, Minneapolis, MN (US); Michael A. Yandrasits, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 24 days.

(21) Appl. No.: 15/733,579

(22) PCT Filed: Mar. 11, 2019

(86) PCT No.: PCT/US2019/021615
§ 371 (c)(1),
(2) Date: Sep. 3, 2020

(87) PCT Pub. No.: WO2019/177972
PCT Pub. Date: Sep. 19, 2019

(65) Prior Publication Data
US 2021/0002407 A1 Jan. 7, 2021

Related U.S. Application Data

(60) Provisional application No. 62/641,732, filed on Mar. 12, 2018.

(51) Int. Cl.
C08F 297/02 (2006.01)
C08F 8/32 (2006.01)

(52) U.S. Cl.
CPC .............. *C08F 297/02* (2013.01); *C08F 8/32* (2013.01); *C08F 2800/10* (2013.01); *C08F 2800/20* (2013.01)

(58) Field of Classification Search
USPC .................................................... 525/332.8
See application file for complete search history.

(56) References Cited

U.S. PATENT DOCUMENTS

| | | | |
|---|---|---|---|
| 4,503,217 A | 3/1985 | Alexander |
| 4,558,101 A | 12/1985 | Jachimowicz |
| 4,657,984 A | 4/1987 | McEntire |
| 5,382,629 A | 1/1995 | Coran |
| 5,434,309 A | 7/1995 | McGrath |
| 5,559,193 A | 9/1996 | McGrath |
| 5,717,048 A | 2/1998 | Tsubaki |
| 6,103,676 A | 8/2000 | Coolbaugh |
| 6,248,798 B1 | 6/2001 | Slingsby |
| 7,589,081 B2 | 9/2009 | Zapf |
| 8,748,330 B2 | 6/2014 | Debe |
| 8,927,776 B2 | 1/2015 | Franke |
| 9,493,397 B2 | 11/2016 | Coates |
| 2005/0215825 A1 | 9/2005 | Briggs |
| 2009/0156699 A1 | 6/2009 | MacDonald |
| 2010/0137460 A1 | 6/2010 | Bert |
| 2012/0035280 A1 | 2/2012 | Jikihara |
| 2013/0090396 A1 | 4/2013 | MacDonald |
| 2013/0296499 A1 | 11/2013 | Coates |
| 2014/0107237 A1 | 4/2014 | Yan |
| 2016/0367980 A1 | 12/2016 | Inomata |
| 2017/0174800 A1 | 6/2017 | Isomura |
| 2017/0183789 A1 | 6/2017 | Matthews |

FOREIGN PATENT DOCUMENTS

| | | |
|---|---|---|
| EP | 0603146 | 6/1994 |
| JP | 06016849 | 1/1994 |
| JP | 06116323 | 4/1994 |
| JP | 06172429 | 6/1994 |
| JP | 2004346140 | 12/2004 |
| JP | 2009173898 | 8/2009 |
| WO | WO 1999-67329 | 12/1999 |
| WO | WO 2016-039999 | 3/2016 |
| WO | WO 2016-168468 | 10/2016 |
| WO | WO 2017-109429 | 6/2017 |
| WO | WO 2019-177944 | 9/2019 |
| WO | WO 2019-177953 | 9/2019 |
| WO | WO 2019-177968 | 9/2019 |

OTHER PUBLICATIONS

Ito, "Coordination—Insertion Copolymerization of Allyl Monomers with Ethylene", Journal of the American Chemical Society, Jan. 4, 2011, vol. 133, No. 5, pp. 1232-1235.

Jaeger, "Synthetic polymers with quaternary nitrogen atoms—Synthesis and structure of the most used type of cationic polyelectrolytes", Progress in Polymer Science, 2010, vol. 35, pp. 511-577, XP26983356A.

McGrath, "Functionalization of Polymers by Metal-Mediated Processes", Chemical Review, 1995, vol. 95, No. 2, pp. 381-398.

Ndoni, "Laboratory-scale setup for anionic polymerization under inert atmosphere", American Institute of Physics, Review of Scientific Instruments, Feb. 1995, vol. 66, No. 2, pp. 1090-1095.

Podzimek, "Light Scattering, Size Exclusion Chromatography and Asymmetric Flow Field Flow Fractionation; Powerful Tools for the Characterization of Polymers, Proteins and Nanoparticles", 64-73 (2011).

Tremont, "Hydroformylation of 1,2- and 1,4-Polybutadiene and Their Mixtures with Hydridocarbonyltris(triphenylphosphine)rhodium(I) Catalyst and Excess Triphenylphosphine", Macromolecules, 1990, vol. 23, No. 7, pp. 1984-1993.

(Continued)

*Primary Examiner* — Fred M Teskin
(74) *Attorney, Agent, or Firm* — Jean A. Lown

(57) ABSTRACT

Described herein are nitrogen-containing multi-block copolymers, as well as methods for making such multi-block copolymers, and articles comprising such multi-block copolymers. The nitrogen-containing multi-block copolymers contains at least one A block comprising polyisoprene; and at least one B block comprising amino-functionalized polybutadiene, the amino-functionalized polybutadiene comprising nitrogen-containing pendant groups.

15 Claims, 1 Drawing Sheet

(56) References Cited

OTHER PUBLICATIONS

Wu, "Efficient and Regioselective Ruthenium-catalyzed Hydroaminomethylation of Olefins", Journal of the American Chemical Society, 2013, vol. 135, No. 10, pp. 3989-3996.
Wu, "Ruthenium-Catalyzed Hydroformylation/Reduction of Olefins to Alcohols: Extending the Scope to Internal Alkenes", Journal of the American Chemical Society, 2013, vol. 135, No. 38, pp. 14306-14312.
Zhang, "Facilitating Anion Transport in Polyolefin-Based Anion Exchange Membranes via Bulky Side Chains", ACS Applied Materials & Interfaces, Aug. 16, 2016, vol. 8, No. 35, pp. 23321-23330.
Zhang, "Highly stable anion exchange membranes based on quaternized polypropylene", Journal of Materials Chemistry A, Apr. 30, 2015, vol. 3, No. 23, pp. 12284-12296.
Zhang, "New Polyethylene Based Anion Exchange Membranes (PE-AEMs) with High Ionic Conductivity", Macromolecules, Jul. 14, 2011, vol. 44, No. 15, pp. 5937-5946.
Zhu, "Exploring backbone-cation alkyl spacers for multi-cation side chain anion exchange membranes", 2018, Journal of Power Sources, vol. 375, pp. 433-441.
Zhu, "Multication Side Chain Anion Exchange Membranes", Macromolecules, Jan. 2016, vol. 49, pp. 815-824.
International Search Report for PCT International Application No. PCT/US2019/021615, dated Jun. 3, 2019, 5 pages.

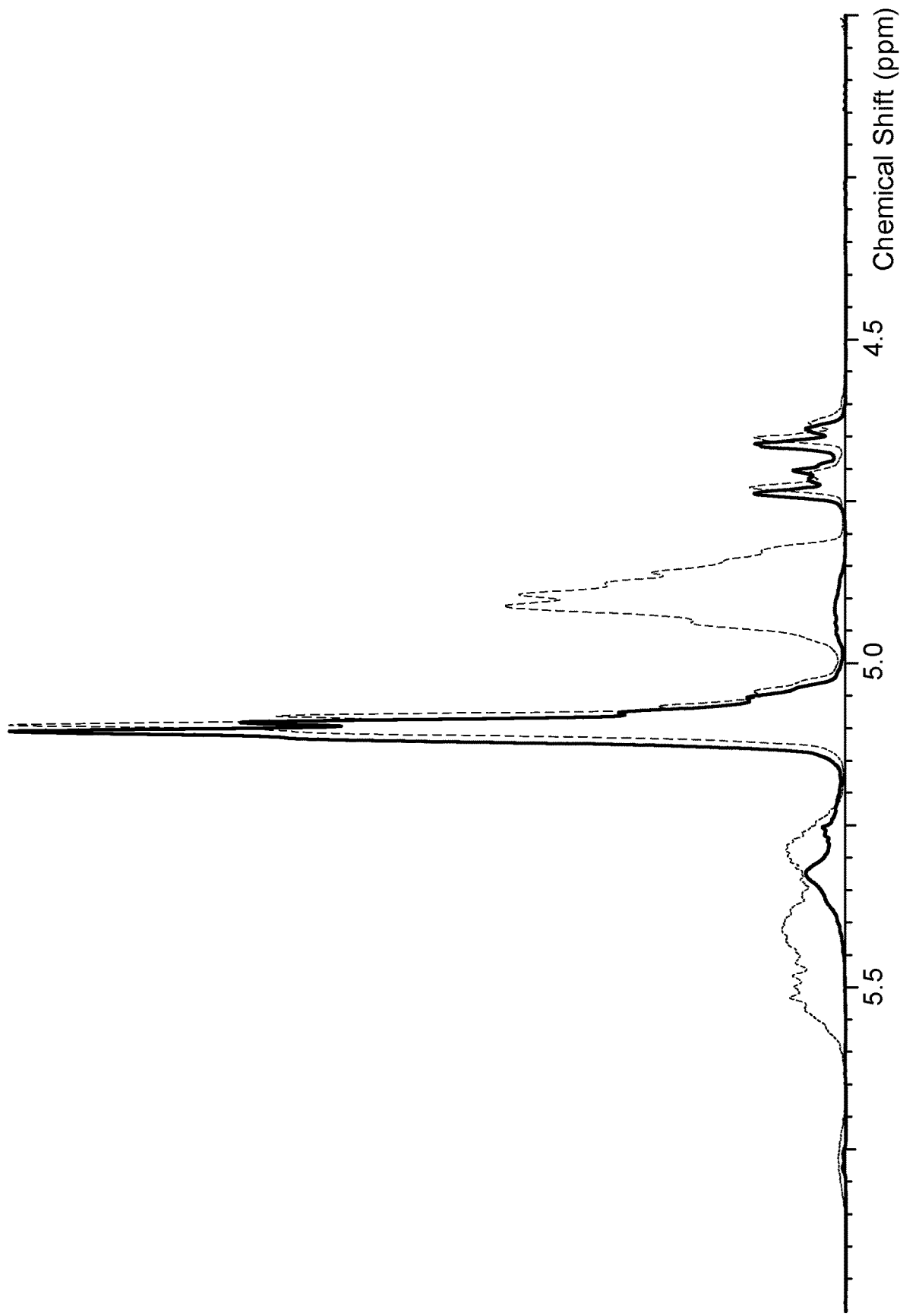

NITROGEN-CONTAINING MULTI-BLOCK COPOLYMERS AND METHOD OF MAKING

CROSS REFERENCE TO RELATED APPLICATION

This application is a national stage filing under 35 U.S.C. 371 of PCT/US2019/021615, filed Mar. 11, 2019, which claims the benefit of U.S. Provisional Patent Application No. 62/641,732, filed Mar. 12, 2018, the disclosure of which is incorporated by reference herein in its/their entirety.

TECHNICAL FIELD

Nitrogen-containing multi-block copolymers and methods of making the multi-block copolymer are provided.

BACKGROUND

Block copolymers with nitrogen-containing blocks have been hard to synthesis and the types of nitrogen-containing groups that have been used in such block copolymers have been quite limited. Block copolymers with nitrogen-containing blocks can be amphiphilic. That is, the block copolymers can possess discrete hydrophobic and hydrophilic domains.

The synthesis of amphiphilic block copolymers can be challenging due to the polymerization methodology that is available. A hydrophilic group is necessarily polar and these groups are typically not compatible with most commonly practiced synthesis methods such as anionic polymerization, early transition metal catalyzed (Ziegler-Natta) polymerization, or group-transfer polymerization (GTP).

SUMMARY

Nitrogen-containing block copolymers and relatively facile methods of making these block copolymers are provided. The block copolymers exhibit micro-phase separation behavior and can be amphiphilic.

In a first aspect, a nitrogen-containing multi-block copolymer is provided that contains at least one polymeric block A (i.e., A block) that comprises polyisoprene and at least one polymeric block B (i.e., B block) that comprises amino-functionalized polybutadiene, the amino-functionalized polybutadiene comprising pendant groups of Formula (I-A).

$$*\text{—}CH_2CH_2CH_2\text{—}NR^1R^2 \qquad \text{(I-A)}$$

In Formula (I-A), group $R^1$ is hydrogen, alkyl, or aryl and group $R^2$ is an alkyl or aryl. Alternatively, $R^1$ and $R^2$ together with the nitrogen to which they are both attached form a heterocyclic ring having 0 to 2 additional heteroatoms selected from nitrogen or oxygen. An asterisk (*) denotes the point of attachment of the pendant groups to a carbon atom in the polymeric backbone of the B block.

In a second aspect, a method for making a nitrogen-containing multi-block copolymer is provided. The method comprises providing or obtaining a precursor multi-block copolymer that comprises at least one first polymeric block comprising polyisoprene and at least one second polymeric block comprising polybutadiene. The polybutadiene in the second polymeric block has pendant vinyl groups of formula *—CH=CH₂ wherein an asterisk (*) denotes the point of attachment of each pendant group to a carbon atom in the polymeric backbone of the second polymeric block. The method further comprises hydroformylating and reductively aminating the pendant vinyl groups of the precursor multi-block copolymer in the presence of at least one transition metal catalyst to form the nitrogen-containing multi-block copolymer. The nitrogen-containing multi-block copolymer comprises at least one polymeric block A (i.e., A block) comprising polyisoprene and at least one polymeric block B (i.e., B block) comprising an amino-functionalized polybutadiene having pendant groups of Formula (I-A).

$$*\text{—}CH_2CH_2CH_2\text{—}NR^1R^2 \qquad \text{(I-A)}$$

In Formula (I-A), group $R^1$ is hydrogen, alkyl, or aryl and group $R^2$ is an alkyl or aryl; or $R^1$ and $R^2$ together with the nitrogen to which they are both attached form a heterocyclic ring having 0 to 2 additional heteroatoms selected from nitrogen or oxygen.

The above summary is not intended to describe each embodiment. The details of one or more embodiments of the invention are also set forth in the description below. Other features, objects, and advantages will be apparent from the description and from the claims.

BRIEF DESCRIPTION OF THE DRAWINGS

The FIGURE is a comparison of the $^1$H-NMR for PE-2 (dashed) and EX-2 (solid). The spectra are displayed slightly offset for clarity.

DESCRIPTION

As used herein, "a", "an", and "the" are used interchangeably and mean one or more.

The term "and/or" is used to indicate one or both stated cases may occur, for example A and/or B includes, (A and B) and (A or B). Thus, the term can be used to mean A alone, B alone, or both A and B.

As used herein, the symbol "⌇" is used to indicate the point of attachment of a repeat unit within a polymeric material to another group within the polymeric material such as another repeat unit or a terminal group.

An asterisk (*) denote the point of attachment of a pendant group to a polymeric chain such as to a carbon atom in the polymeric chain.

The term "polymer" refers to a macrostructure having a number average molecular weight (Mn) of at least 5,000 Daltons, at least 10,000 Daltons, at least 25,000 Daltons, at least 50,000 Daltons, at least 100,000 Daltons, at least 300,000 Daltons, at least 500,000 Daltons, at least 750,000 Daltons, at least 1,000,000 Daltons, or even at least 1,500,000 Daltons. The polymer can be a homopolymer, copolymer, terpolymer, and the like. The polymer can be a random or block copolymer.

The term "polymer backbone" refers to the main continuous chain of the polymer. A "carbon backbone" means that there are carbon atoms but no heteroatoms in the main continuous chain.

As used herein, the term "alkyl" broadly refers to substituted or unsubstituted monovalent linear chain and branched alkyl groups, as well as cyclic alkyl groups, having from 1 to about 40 carbon atoms, 1 to 30 carbon atoms, 1 to 12 carbons or, in some embodiments, from 8 to 30 carbon atoms, 12 to 20 carbon atoms, 16 to 30 carbon atoms, 1 to 8 carbon atoms, or 1 to 4 carbon atoms. Such alkyl groups may be substituted or unsubstituted. Examples of linear chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include those with from 1 to 8 carbon atoms such as isopropyl, iso-butyl, sec-butyl, t-butyl, neopentyl, isopentyl, and 2,2-dimethylpropyl groups. As used herein, the term "alkyl" encompasses n-alkyl, and isoalkyl groups as well as other branched chain forms of alkyl. Cyclic alkyl (i.e., cycloalkyl) groups have at least 3, at least 4, at least 5, or at least 6 carbon atoms. Examples of cycloalkyl groups include those with from 3 to 8 carbon atoms such as cyclopropyl, cyclobutyl, cyclopentyl, and cyclohexyl.

As used herein, the term "alkylene" broadly refers to substituted or unsubstituted divalent linear chain, branched, and cyclic alkylene (i.e., cycloalkylene) groups having from 1 to about 40 carbon atoms ($C_1$-$C_{40}$), 1 to about 20 carbon atoms ($C_1$-$C_{20}$), 1 to 12 carbon atoms ($C_1$-$C_{12}$), 1 to 8 carbon atoms ($C_1$-$C_8$), 1 to 6 carbon atoms ($C_1$-$C_6$) or, in some examples, from 6 to 12 carbon atoms ($C_6$-$C_{12}$), 6 to 10 carbon atoms ($C_6$-$C_{10}$), 8 to 12 carbon atoms ($C_8$-$C_{12}$), 8 to 10 carbon atoms ($C_8$-$C_{10}$), 4 to 9 carbon atoms ($C_4$-$C_9$), 6 to 9 carbon atoms ($C_6$-$C_9$), and 6 to 8 carbon atoms ($C_6$-$C_8$). Cyclic alkylenes may have at least 3, at least 4, at least 5, or at least 6 carbon atoms. Examples of linear chain divalent alkylene groups include those having from 1 to 8 carbon atoms such as ethyl (—$CH_2CH_2$—), n-propyl (—$CH_2CH_2CH_2$—), n-butyl (—$CH_2CH_2CH_2CH_2$—), n-pentyl (—$CH_2CH_2CH_2CH_2CH_2$—), n-hexyl (—$CH_2CH_2CH_2CH_2CH_2CH_2$—), n-heptyl (—$CH_2CH_2CH_2CH_2CH_2CH_2CH_2$—), and n-octyl (—$CH_2CH_2CH_2CH_2CH_2CH_2CH_2CH_2$—) groups.

The term "aryl" refers to substituted or unsubstituted cyclic aromatic hydrocarbons that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some examples, aryl groups contain about 6 to about 14 carbons atoms ($C_6$-$C_{14}$) or from 6 to 10 carbon atoms ($C_6$-$C_{10}$) in the ring portions of the groups. Aryl groups can be unsubstituted or substituted, as defined herein.

As used herein, the term "substituted" broadly refers to a group (e.g., an alkyl group or an aryl group) in which at least one hydrogen atom contained therein is replaced by at least one "substituent." Examples of substituents include, but are not limited to: alkyl, halogen (e.g., F, Cl, Br, and I), and various oxygen-containing groups such as hydroxyl groups, alkoxy groups, and aryloxy groups (the oxygen atom is typically the atom connected to the group that is substituted). One example is an aryl substituted by an alkyl, alkoxy, or halo.

The terms "halo" or "halogen" or "halide," by themselves or as part of another substituent, mean, unless otherwise stated, an atom or ion of fluorine, chlorine, bromine, or iodine.

Recitation of ranges by endpoints includes all numbers subsumed within that range (e.g., 1 to 10 includes 1.4, 1.9, 2.33, 5.75, 9.98, etc.).

Recitation of "at least one" includes all numbers of one and greater (e.g., at least 2, at least 4, at least 6, at least 8, at least 10, at least 25, at least 50, at least 100, and the like).

The term "about" as used herein can allow for a degree of variability in a value or range, for example, within 10%, within 5%, or within 1% of a stated value or of a stated limit of a range.

The present disclosure relates to nitrogen-containing multi-block copolymers, to methods for making such multi-block copolymers, and articles comprising such multi-block copolymers. The nitrogen-containing multi-block copolymer has at least one polymeric block that comprises polyisoprene and at least one block that includes polybutadiene functionalized with pendant nitrogen-containing groups (i.e., amino-functionalized butadiene).

The nitrogen-containing multi-block copolymer is formed from a precursor multi-block copolymer that has at least one first block that is polyisoprene containing repeat units of isoprene and at least one second block that is polybutadiene. The polybutadiene block contains 1,2-butadiene repeat units and optionally 1,4-buatadiene repeat units. The 1,2-butadiene repeat units provide pendant vinyl groups that can be amino-functionalized by subjecting the precursor multi-block copolymer to hydroformylating and reductively aminating. The resulting nitrogen-containing multi-block copolymer has pendant amino-containing groups.

The nitrogen-containing multi-block copolymer contains at least one polymeric block A (A block) corresponds to the first block of the precursor multi-block copolymer. This block is polyisoprene. The nitrogen-containing multi-block copolymer contains at least one polymeric block B (B block) that is derived from the second block (the polybutadiene block) of the precursor multi-block copolymer. This block contains amino-functionalized butadiene repeat units having pendant amino-containing groups.

The nitrogen-containing multi-block copolymer contains at least one polymeric block A (i.e., A block) that comprises polyisoprene and at least one polymeric block B (B block) that comprises amino-functionalized polybutadiene. There can be a single or multiple A blocks and single or multiple B blocks. The amino-functionalized polybutadiene has pendant groups of Formula (I-A).

$$*—CH_2CH_2CH_2—NR^1R^2 \qquad \text{(I-A)}$$

In Formula (I-A), group $R^1$ is hydrogen, alkyl, or aryl and group $R^2$ is an alkyl or aryl. Alternatively, $R^1$ and $R^2$ together with the nitrogen to which they are both attached form a heterocyclic ring having 0 to 2 additional heteroatoms selected from nitrogen or oxygen. An asterisk (*) denotes the point of attachment of the pendant groups to a carbon atom in the polymeric backbone of the B block.

Overall, 5 to 95 mole percent of the repeat units in the nitrogen-containing multi-block copolymer are isoprene repeat units. Stated differently, the nitrogen-containing multi-block copolymer contains 5 to 95 mole percent of polymeric block A (A block). The nitrogen-containing multi-block copolymer can contain at least 10 mole percent, at least 20 mole percent, at least 30 mole percent, at least 40 mole percent, at least 50 mole percent, or at least 60 mole percent and up to 90 mole percent, up to 80 mole percent, up to 70 mole percent, or up to 60 mole percent isoprene repeat units. The amount can be in a range of 10 to 95 mole percent, 10 to 90 mole percent, 15 to 80 mole percent, 20 to 90 mole percent, 25 to 80 mole percent, 30 to 90 mole percent, 35 to 80 mole percent, 40 to 90 mole percent, 45 to 80 mole percent, 50 to 90 mole percent, 45 to 80 mole percent, or 50 to 80 mole percent. The amount is based on the total moles of repeat units in the nitrogen-containing multi-block copolymer.

The isoprene repeat units in the nitrogen-containing block multi-block copolymer can be of Formula (II-A) or (II-B) depending on how the isoprene is produced and/or purified. Formula (II-A) can be in a cis or trans configuration.

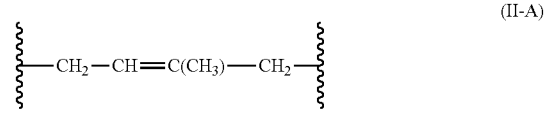

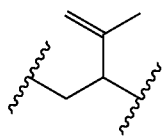

(II-B)

Typically, it is preferable that most of the isoprene repeat units are of Formula (II-A). That is, at least 70 mole percent, at least 75 mole percent, at least 80 mole percent, at least 85 mole percent, at least 90 mole percent, at least 93 mole percent and up to 98 mole percent, up to 97 mole percent, up to 96 mole percent, up to 95 mole percent, up to 93 mole percent, or up to 90 mole percent of the isoprene repeat units are of Formula (II-A). If isoprene repeat units of Formula (II-B) are present in the precursor multi-block copolymer used to form the nitrogen-containing multi-block copolymer, these repeat units typically do not aminate during hydroformylating and reductively aminating to form the nitrogen-containing multi-block copolymer having pendant amino-containing groups. That is, the A block (i.e., the polyisoprene block) usually has little or no amino-functional pendant groups in the nitrogen-containing multi-block copolymer. For example, no more than 2 mole percent, no more than 1 mole percent, no more than 0.5 mole percent, no more than 0.2 mole percent, or no more than 0.1 mole percent of the isoprene repeat units undergo amination.

The A blocks tend to provide hydrophobic character to the nitrogen-containing multi-block copolymer. These blocks are often elastomeric.

The precursor multi-block copolymer used to form the nitrogen-containing multi-block copolymer contains a second polymeric block that is polybutadiene. The polybutadiene in the second polymeric block undergoes hydroformylating and reductively aminating to form the polymeric B block (B block) in the nitrogen-containing multi-block copolymer. Thus, the B blocks contain repeat units with the pendant nitrogen-containing groups.

Overall, 5 to 90 mole percent of the repeat units in the nitrogen-containing block copolymer are butadiene repeat units or are derived from butadiene repeat units. Stated differently, nitrogen-containing multi-block copolymer contains 5 to 90 mole percent B block. The nitrogen-containing multi-block copolymer contains at least 5 mole percent, at least 10 mole percent, at least 20 mole percent, at least 30 mole percent, at least 40 mole percent, at least 50 mole percent, or at least 60 mole percent and up to 90 mole percent, up to 80 mole percent, up to 70 mole percent, up to 60 mole percent, up to 50 mole percent, or up to 40 mole percent B block. The amount can be in a range of 5 to 80 mole percent, 10 to 80 mole percent, 5 to 70 mole percent, 10 to 70 mole percent, 5 to 60 mole percent, 10 to 60 mole percent, 5 to 50 mole percent, 10 to 50 mole percent, 5 to 40 mole percent, or 10 to 40 mole percent. The amount is based on the total moles of repeat units in the nitrogen-containing multi-block copolymer.

The precursor multi-block copolymer that is used to form the nitrogen-containing multi-block copolymer has a second polymeric block that contains repeat units of 1,2-butadiene and optionally repeat units of 1,4-butadiene. The 1,4-butadiene repeat units and the 1,2-butadiene repeat units are shown respectively in Formula (III-A) and Formula (III-B). Formula (III-A) can be in a cis or trans configuration.

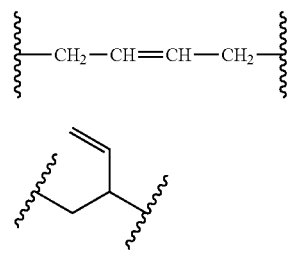

(III-A)

(III-B)

The amino-functionalized butadiene repeat units in the B block of the nitrogen-containing multi-block copolymer are predominately derived from the 1,2-butadiene repeat units (Formula (III-B)) in the precursor multi-block copolymer.

The amino-functionalized repeat units in the B block of the nitrogen-containing multi-block copolymer can be of Formula (IV-A), which shows the pendant groups of Formula (I-A) attached to the carbon backbone of the polymer.

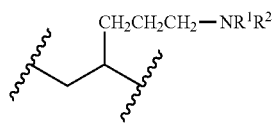

(IV-A)

The B block optionally can include butadiene repeat units that have not been amino-functionalized. These typically correspond to the 1,4-butadiene repeat units of Formula (III-A) that were present in the precursor multi-block copolymer or isomerization products derived thereof. That is, the 1,4-butadiene repeat units typically are not functionalized during hydroformylating and reductively aminating. The nitrogen-containing multi-block copolymer contains 5 to 100 mole percent amino-functionalized repeat units of Formula (IV-A) and optionally 0 to 95 mole percent 1,4-butadiene repeat units of Formula (III-A) in the B block. The amounts are based on the total moles of repeat units in the B blocks.

In the nitrogen-containing multi-block copolymer, the amount of amino-functionalized repeat units of Formula (IV-A) can be in a range of 5 to 100 mole percent based on the total moles of repeat units in the B block. The amount of amino-functionalized repeat units can be at least 5 mole percent, at least 10 mole percent, at least 20 mole percent, at least 30 mole percent, at least 40 mole percent, at least 50 mole percent, at least 60 mole percent, or at least 70 mole percent and can be up to 100 mole percent, up to 90 mole percent, up to 80 mole percent, up to 70 mole percent, up to 60 mole percent, or up to 50 mole percent. The amounts are based on the total moles of repeat units in the B block.

The nitrogen-containing multi-block copolymer can further include optional 1,4-butadiene repeat units of Formula (III-A) in a range of 0 to 95 mole percent in the B block. The amount can be at least 5 mole percent, at least 10 mole percent, at least 20 mole percent, at least 30 mole percent, at least 40 mole percent, at least 50 mole percent, at least 60 mole percent and can be up to 95 mole percent, up to 80 mole percent, up to 70 mole percent, up to 60 mole percent, up to 50 mole percent, or up to 40 mole percent. The amounts are based on the total moles of repeat units in the B block.

The B block of the nitrogen-containing multi-block copolymer can further include optional 1,2-butadiene repeat units of Formula (III-B) in a range of 0 to 5 mole percent. For example, the amount can be at least 1 mole percent, at least 2 mole percent, at least 3 mole percent and up to 5 mole percent, up to 4 mole percent, or up to 3 mole percent. The amounts are based on the total moles of repeat units in the B blocks. The presence of this repeat unit can result from incomplete conversion of the 1,2-butadiene repeat units in the precursor multi-block copolymer to amino-containing functional groups.

In some embodiments, the nitrogen-containing multi-block copolymer further contains an additional polymeric block. That is, the nitrogen-containing multi-block copolymer further comprises a polymeric block C (i.e., C block). There can be one or more such blocks. This block typically comprises a polymer formed from a styrene-type monomer. The term "styrene-type" monomer refers to styrene and/or alpha-methyl styrene that is optionally substituted with one or more alkyl groups. The styrene-type repeat units are of one or both of the following formulas.

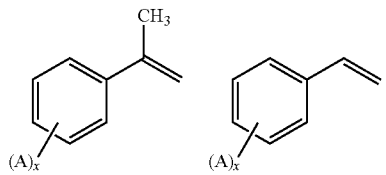

In these formulas, A is an optional alkyl and the variable x is an integer in a range from 0 to 2. That is, the aromatic ring optionally can be substituted with up to two alkyl groups. Any alkyl group substituent has 1 to 6 carbon atoms, 1 to 4 carbon atoms, or 1 to 3 carbon atoms. The alkyl group is often methyl or t-butyl.

Overall, the nitrogen-containing multi-block copolymer can contain 0 to 90 mole percent styrene-type repeat units based on the total moles of repeat units. That is the nitrogen-containing multi-block copolymer can contain 0 to 90 mole percent C block. The amount can be at least 5 mole percent, at least 10 mole percent, at least 20 mole percent, at least 30 mole percent, at least 40 mole percent, or at least 50 mole percent and can be up to 90 mole percent, up to 80 mole percent, up to 70 mole percent, up to 60 mole percent, up to 50 mole percent, up to 40 mole percent, up to 30 mole percent, or up to 20 mole percent. The amount can be in a range of 0 to 80 mole percent, 0 to 70 mole percent, 0 to 60 mole percent, 0 to 50 mole percent, 0 to 40 mole percent, or 0 to 30 mole percent. The amount is based on the total moles of repeat units in the multi-block copolymer.

The nitrogen-containing multi-block copolymer has at least one A block and at least one B block. There can be more than one A block and more than one B block. Optionally, there can be one or more C blocks. Each of these blocks is described above. Example multi-block constructions include, but are not limited to, AB, ABA, BAB, ABC, ACB, CAB, CABC, CABAC, ACBCA, ABCBA, ACAB, CACB, BCBA, and CBCA.

The overall composition of the nitrogen-containing multi-block copolymer is generally 5 to 95 mole percent A block, 5 to 90 mole percent B block, and 0 to 90 mole percent C block. The amounts are based on the total moles of repeat units in the multi-block copolymer. In some embodiments, the nitrogen-containing block copolymer contains 20 to 90 mole percent A block, 5 to 50 mole percent B block, and 0 to 70 mole percent C block. In other embodiments, the nitrogen-containing block copolymer contains 50 to 80 mole percent A block, 10 to 40 mole percent B block, and 0 to 30 mole percent C block.

The nitrogen-containing multi-block copolymer has pendant groups of Formula (I-A).

In Formula (I-A), group $R^1$ is hydrogen, alkyl, or aryl and $R^2$ is an alkyl or aryl. Alternatively, $R^1$ and $R^2$ together with the nitrogen to which they are both attached form a heterocyclic ring having 0 to 2 additional heteroatoms selected from nitrogen or oxygen. An asterisk (*) denotes the point of attachment of the pendant groups to a carbon atom in the polymeric backbone of the B block. This pendant group is attached to the carbon backbone of the B block as shown in Formula (IV-A).

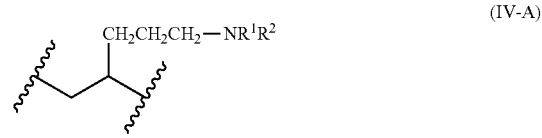

The nitrogen-containing multi-block copolymer can optionally further contain a second pendant group of Formula (I-B).

The molar ratio of pendant groups of Formula (I-A) to pendant groups of Formula (I-B) can be at least about 6 such as at least about 10, at least about 15, at least about 25, at least about 35, at least about 50, at least about 100 or at least about 500. The molar ratio is often in a range of about 15 to about 50, about 30 to about 100 or about 80 to about 500. The presence of a second pendant group of Formula (I-B) results in the presence of repeat units of Formula (IV-B) in the B block.

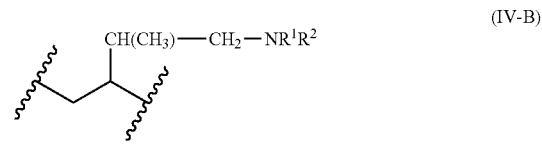

Suitable alkyl groups for $R^1$ and $R^2$ for pendant groups (IA) and (IB) and for repeat units of Formula (IV-A) and (IV-B) often have 1 to 10 carbon atoms, 1 to 6 carbon atoms, or 1 to 4 carbon atoms. Suitable aryl groups for $R^1$ and $R^2$ often have 6 to 10 carbon atoms. The aryl is often phenyl. The phenyl optionally can be substituted with another group such as an alkyl or halogen.

In some embodiments, $R^1$ and $R^2$ together with the nitrogen to which they are attached form a heterocyclic ring, wherein the heterocyclic ring is saturated and optionally further comprises 0 to 2 heteroatoms. The heteroatoms are typically nitrogen or oxygen. For example, $R^1$ and $R^2$ together with the nitrogen to which they are attached form a 5 or 6 membered heterocyclic ring such as pyrrolidinyl, piperidinyl, piperazinyl, or morpholinyl.

In another aspect, a method for making a nitrogen-containing multi-block copolymer is provided. The method comprises providing or obtaining a precursor multi-block copolymer that comprises at least one first polymeric block comprising polyisoprene and at least one second polymeric block comprising polybutadiene. The polybutadiene in the second polymeric block has pendant vinyl groups of formula *—CH=CH$_2$ wherein an asterisk (*) denotes the point of attachment of each pendant group to a carbon atom in the polymeric backbone of the second polymeric block. The method further comprises hydroformylating and reductively aminating the pendant vinyl groups of the precursor multi-block copolymer in the presence of at least one transition metal catalyst to form the nitrogen-containing multi-block copolymer. The nitrogen-containing multi-block copolymer comprises at least one polymeric block A (i.e., A block) comprising polyisoprene and at least one polymeric block B (i.e., B block) comprising an amino-functionalized polybutadiene having pendant groups of Formula (I-A).

  (I-A)

In Formula (I-A), group R$^1$ is hydrogen, alkyl, or aryl and group R$^2$ is an alkyl or aryl; or R$^1$ and R$^2$ together with the nitrogen to which they are both attached form a heterocyclic ring having 0 to 2 additional heteroatoms selected from nitrogen or oxygen.

The precursor multi-block copolymer is used to form the nitrogen-containing multi-block copolymer. The precursor multi-block copolymer has a first polymeric block that is polyisoprene and a second polymeric block that is polybutadiene. The first polymeric block of the precursor corresponds to the A block of the nitrogen-containing multi-block copolymer. This first polymeric block typically does not undergo functionalization (or is only functionalized to a small extent) during the hydroformylating and reductively aminating processes used to form the nitrogen-containing multi-block copolymer.

Overall, 5 to 95 mole percent of the repeat units in the precursor multi-block copolymer are isoprene repeat units. Stated differently, the precursor multi-block copolymer contains 5 to 95 mole percent of the first polymeric block. The precursor multi-block copolymer can contain at least 10 mole percent, at least 20 mole percent, at least 30 mole percent, at least 40 mole percent, at least 50 mole percent, or at least 60 mole percent and up to 95 mole percent, up to 90 mole percent, up to 80 mole percent, up to 70 mole percent, or up to 60 mole percent isoprene repeat units. The amount can be in a range of 10 to 95 mole percent, 10 to 90 mole percent, 15 to 80 mole percent, 20 to 90 mole percent, 25 to 80 mole percent, 30 to 90 mole percent, 35 to 80 mole percent, 40 to 90 mole percent, 45 to 90 mole percent, 50 to 90 mole percent, 45 to 80 mole percent, or 50 to 80 mole percent isoprene repeat units. The amount is based on the total moles of repeat units in the precursor multi-block copolymer.

As stated above for the nitrogen-containing multi-block copolymer, the isoprene repeat units in the precursor multi-block copolymer can be of Formula (II-A) or (II-B) depending on how the isoprene is produced and/or purified. Formula (II-A) can be in a cis or trans configuration.

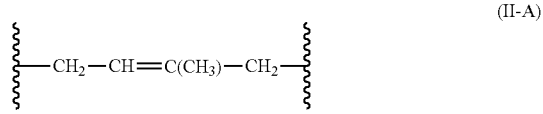  (II-A)

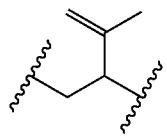  (II-B)

Typically, it is preferable that most of the isoprene repeat units are of Formula (II-A). That is, at least 70 mole percent, at least 75 mole percent, at least 80 mole percent, at least 85 mole percent, at least 90 mole percent, at least 93 mole percent and up to 98 mole percent, up to 97 mole percent, up to 96 mole percent, up to 95 mole percent, up to 93 mole percent, or up to 90 mole percent of the isoprene repeat units are of Formula (II-A). If isoprene repeat units of Formula (II-B) are present in the precursor multi-block copolymer used to form the nitrogen-containing multi-block copolymer, these repeat units typically do not aminate (or aminate only to a small extent) during hydroformylating and reductively aminating to form the nitrogen-containing multi-block copolymer having pendant amino-containing groups.

The precursor multi-block copolymer contains a second polymeric block that is polybutadiene. Overall, 5 to 90 mole percent of the repeat units in the precursor multi-block copolymer are butadiene repeat units or are derived from butadiene repeat units. Stated differently, the precursor multi-block copolymer contains 5 to 90 mole percent of the second polymeric block. The precursor multi-block copolymer contains at least 5 mole percent, at least 10 mole percent, at least 20 mole percent, at least 30 mole percent, at least 40 mole percent, at least 50 mole percent, or at least 60 mole percent and up to 90 mole percent, up to 80 mole percent, up to 70 mole percent, up to 60 mole percent, up to 50 mole percent, or up to 40 mole percent of the second polymeric block (polybutadiene). The amount can be in a range of 5 to 80 mole percent, 10 to 80 mole percent, 5 to 70 mole percent, 10 to 70 mole percent, 5 to 60 mole percent, 10 to 60 mole percent, 5 to 50 mole percent, 10 to 50 mole percent, 5 to 40 mole percent, or 10 to 40 mole percent. The amount is based on the total moles of repeat units in the precursor multi-block copolymer.

The second polymeric block of the precursor multi-block copolymer contains repeat units of 1,2-butadiene and optionally repeat units of 1,4-butadiene. The 1,4-butadiene repeat units and the 1,2-butadiene repeat units are shown respectively in Formula (III-A) and (III-B).

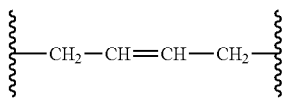  (III-A)

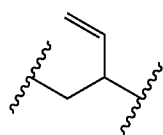  (III-B)

The amino-functionalized butadiene repeat units in the nitrogen-containing multi-block copolymer are derived from the 1,2-butadiene repeat units in the precursor multi-block copolymer. The precursor multi-block copolymer used to form the nitrogen-containing multi-block copolymer contains 0 to 95 mole percent 1,4-butadiene repeat units of Formula (III-A) and 5 to 100 mole percent 1,2-butadiene repeat units of Formula (III-B) in the second block (i.e., the butadiene block or blocks).

In the precursor multi-block copolymer, the amount of 1,2-butadiene repeat units of Formula (III-B) can be in a range of 5 to 100 mole percent based on the total moles or butadiene repeat units in the second polymeric block. The amount of 1,2-butadiene repeat units can be at least 5 mole percent, at least 10 mole percent, at least 20 mole percent, at least 30 mole percent, at least 40 mole percent, at least 50 mole percent, at least 60 mole percent, or at least 70 mole percent and can be up to 100 mole percent, up to 90 mole percent, up to 80 mole percent, up to 70 mole percent, up to 60 mole percent, or up to 50 mole percent. The amounts are based on the total moles of repeat units in the second polymeric block.

The precursor multi-block copolymer can further include optional 1,4-butadiene repeat units of Formula (III-A) in a range of 0 to 95 mole percent. The amount can be at least 5 mole percent, at least 10 mole percent, at least 20 mole percent, at least 30 mole percent, at least 40 mole percent, at least 50 mole percent, at least 60 mole percent and can be up to 90 mole percent, up to 80 mole percent, up to 70 mole percent, up to 60 mole percent, up to 50 mole percent, or up to 40 mole percent. The amounts are based on the total moles or repeat units in the second polymeric block.

In some embodiments, the precursor multi-block copolymer further contains an additional polymeric block. That is, the precursor multi-block copolymer further comprises a third polymeric block. There can be one or more such blocks. This block typically comprises a polymer formed from a styrene-type monomer. The term "styrene-type" monomer refers to styrene or an alkyl substituted styrene. Examples of alkyl substituted styrene include alpha-methyl styrene and tert-butyl styrene. Like the first polymeric block, the third polymeric block typically is not altered during hydroformylating and reductively aminating to form the nitrogen-containing multi-block copolymer.

Overall, the precursor multi-block copolymer can contain 0 to 90 mole percent styrene-type repeat units based on the total moles of repeat units. That is the precursor multi-block copolymer can contain 0 to 90 mole percent of the third polymeric block. The amount can be at least 5 mole percent, at least 10 mole percent, at least 20 mole percent, at least 30 mole percent, at least 40 mole percent, or at least 50 mole percent and can be up to 90 mole percent, up to 80 mole percent, up to 70 mole percent, up to 60 mole percent, up to 50 mole percent, up to 40 mole percent, up to 30 mole percent, or up to 20 mole percent. The amount can be in a range of 0 to 80 mole percent, 0 to 70 mole percent, 0 to 60 mole percent, 0 to 50 mole percent, 0 to 40 mole percent, or 0 to 30 mole percent. The amount is based on the total moles of repeat units in the precursor multi-block copolymer.

The overall composition of the precursor multi-block copolymer is generally 5 to 95 mole percent first polymeric block (polyisoprene), 5 to 90 mole percent second polymeric block (polybutadiene), and 0 to 90 mole percent third polymeric block (polystyrene-type block). The amounts are based on the total moles of repeat units in the precursor multi-block copolymer. In some embodiments, the precursor multi-block copolymer contains 20 to 90 mole percent first polymeric block, 5 to 50 mole percent second polymeric block, and 0 to 70 mole percent third polymeric block. In other embodiments, the precursor multi-block copolymer contains 50 to 80 mole percent first polymeric block, 10 to 40 mole percent second polymeric block, and 0 to 30 mole percent third polymeric block.

The precursor multi-block copolymer can be prepared by any method known in the art. For example, the precursor multi-block copolymer can be prepared using sequential anionic polymerization methods. An exemplary method of preparation of the precursor multi-block copolymer is included in the Example section.

Hydroformylating and reductively aminating the precursor multi-block copolymer can comprise forming a reaction mixture that contains a) the precursor multi-block copolymer dissolved in an organic solvent, b) an amine compound of formula $NHR^1R^2$, c) at least one transition metal catalyst, and d) an optional phosphine compound. The reaction mixture is exposed to a gaseous mixture of carbon monoxide and hydrogen to form a product of the reaction mixture.

The precursor multi-block copolymer can be dissolved in any suitable organic solvent or mixture of solvents. Examples of suitable solvents include alkanols (e.g., methanol, ethanol, and isopropanol), aromatic solvents (e.g., benzene, toluene, and xylenes), ethers such as cyclic ethers and dimethoxy ethane, and mixtures thereof.

In amine compound of formula $NHR^1R^2$, groups $R^1$ and $R^2$ are the same as defined above. In some embodiments, the amine compound is a 5 or 6 membered heterocyclic ring such as a pyrrolidine, piperidine, piperazine, or a morpholine.

The hydroformylation and reductive amination can be carried out in the presence of at least one first transition metal catalyst, of which at least one is a ruthenium catalyst or a rhodium catalyst. For example, the ruthenium catalyst can be a ruthenium carbonyl catalyst such as $Ru_3(CO)_{12}$. The rhodium catalyst can be a rhodium carbonyl catalyst such as $(acac)Rh(CO)_2$. The hydroformylation and reductive amination can be carried out in the presence of a phosphine compound that is of Formula (V).

In Formula (V), groups $R^{10}$ and $R^{11}$ are each independently an alkyl or aryl. Group $R^{12}$ is an aryl or an aryl optionally substituted with at least one alkyl or alkoxy group.

The $R^{10}$ and $R^{11}$ groups can each be independently alkyl or aryl. Suitable alkyl groups can be linear, branched or cyclic. The alkyl group often has 1 to 10 carbon atoms. Examples include, but are not limited to, cyclohexyl, tert-butyl, and iso-propyl. Suitable aryl groups can have 6 to 10 carbon atoms and is often phenyl. The aryl group can optionally be substituted such as, for example, with one or more alkyl groups. The $R^{12}$ group can be aryl having 5 to 10 carbon atoms and is often phenyl. The aryl $R^{12}$ group can optionally substituted with one or more alkyl or alkoxy groups. For example, the $R^{12}$ group can be phenyl, a mesityl group or a 2-methoxyphenyl group. An example of a suitable phosphine compound of Formula (V) is the following compound.

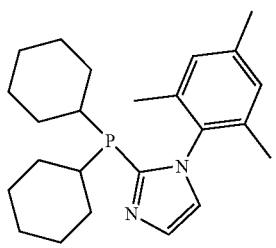 [SMILES: Cc1cc(C)c(-n2ccnc2P(C2CCCCC2)C2CCCCC2)c(C)c1]

The method for hydroformylating and reductively aminating the precursor polymer comprises forming a reaction mixture and exposing the reaction mixture to a gaseous mixture of carbon monoxide and hydrogen (e.g., a mixture of from about 2:1 $CO:H_2$ to about 1:5 $CO:H_2$, also called "syngas" or "synthesis gas"). The exposing is carried out at a sufficiently elevated pressure (e.g., from about 300 pounds per square inch (psi) to about 5000 psi) of a gaseous mixture of carbon monoxide and hydrogen and a sufficiently elevated temperature (e.g., from about 60° C. to about 180° C.) and for a time (e.g., about 6 hours to about 100 hours) sufficient to hydroformylate and reductively aminate the precursor copolymer.

The product from this reaction mixture is, in turn, optionally hydrogenated in the presence of the at least one transition metal catalyst used during the hydroformylating and reductively aminating. When the product from the reaction mixture is hydrogenated in the presence of at least one transition metal catalyst, the level of unsaturation of the product from the reaction mixture and that of the hydrogenated product of the reaction mixture is within about 10% of one another (e.g., is about the same, within about 1%, about 5% or about 8% of one another).

The final product is the nitrogen-containing multi-block copolymer described above. This multi-block copolymer exhibits micro-phase separation behavior and can be amphiphilic. It can be used, for example, as a tie layer to facilitate adhesion of one type of surface to another type of surface. Thus, articles comprising the nitrogen-containing multi-block copolymers are provided.

Various embodiments are provided that include a nitrogen-containing multi-block copolymer and methods of making the nitrogen-containing multi-block copolymer.

Embodiment 1 is a nitrogen-containing multi-block copolymer that contains at least one polymeric block A (i.e., A block) that comprises polyisoprene and at least one polymeric block B (B block) that comprises amino-functionalized polybutadiene, the amino-functionalized polybutadiene comprising pendant groups of Formula (I-A).

$$*-CH_2CH_2CH_2-NR^1R^2 \quad (I-A)$$

In Formula (I-A), group $R^1$ is hydrogen, alkyl, or aryl and $R^2$ is an alkyl or aryl. Alternatively, $R^1$ and $R^2$ together with the nitrogen to which they are both attached form a heterocyclic ring having 0 to 2 additional heteroatoms selected from nitrogen or oxygen. An asterisk (*) denotes the point of attachment of the pendant groups to a carbon atom in the polymeric backbone of the B block.

Embodiment 2 to the nitrogen-containing multi-block copolymer of Embodiment 1, wherein the at least one B block comprising amino-functionalized polybutadiene further comprises pendant groups of Formula (I-B).

$$*-CH(CH_3)-CH_2-NR^1R^2 \quad (I-B)$$

In Formula (I-B), group $R^1$ is hydrogen, alkyl, or aryl and $R^2$ is an alkyl or aryl. Alternatively, $R^1$ and $R^2$ together with the nitrogen to which they are both attached form a heterocyclic ring having 0 to 2 additional heteroatoms selected from nitrogen or oxygen. An asterisk (*) denotes the point of attachment of the pendant groups to a carbon atom in the polymeric backbone of the B block.

Embodiment 3 relates to the nitrogen-containing multi-block copolymer of Embodiment 2 having a molar ratio of pendant groups of Formula (I-A) to pendant groups of Formula (I-B) of at least 6 or at least 15.

Embodiment 4 relates to the nitrogen-containing multi-block copolymer of any one of Embodiments 1 to 3, wherein the nitrogen-containing multi-block copolymer comprises 5 to 95 mole percent A block (or 5 to 95 mole percent isoprene repeat units) based on the total moles of repeat units in the nitrogen-containing multi-block copolymer.

Embodiment 5 relates to the nitrogen-containing multi-block copolymer of any one of Embodiments 1 to 4, wherein the nitrogen-containing multi-block copolymer comprises 20 to 90 mole percent A block (or 20 to 90 mole percent isoprene repeat units) based on the total moles of repeat units in the nitrogen-containing multi-block copolymer.

Embodiment 6 relates to the nitrogen-containing multi-block copolymer of Embodiment 5, wherein the nitrogen-containing multiblock copolymer comprises 50 to 80 mole percent A block (or 50 to 80 mole percent isoprene repeat units) based on the total moles of repeat units in the nitrogen-containing multi-block copolymer.

Embodiment 7 relates to the nitrogen-containing multi-block copolymer of any one of Embodiments 1 to 6, wherein the B block comprises amino-functionalized repeat units of Formula (IV-A).

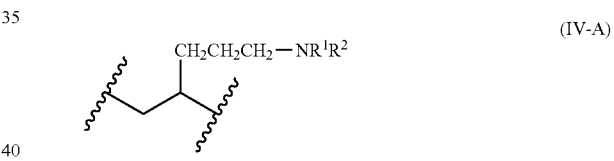

(IV-A)

In Formula (IV-A), group $R^1$ is hydrogen, alkyl, or aryl and $R^2$ is an alkyl or aryl. Alternatively, $R^1$ and $R^2$ together with the nitrogen to which they are both attached form a heterocyclic ring having 0 to 2 additional heteroatoms selected from nitrogen or oxygen. An asterisk (*) denotes the point of attachment of the pendant groups to a carbon atom in the polymeric backbone of the B block. The repeat units of Formula (IV-A) have pendant groups of Formula (I-A).

$$*-CH_2CH_2CH_2-NR^1R^2 \quad (I-A)$$

Embodiment 8 relates to the nitrogen-containing multi-block copolymer of Embodiment 7, wherein the B block further comprises 1,4-butadiene repeat units of Formula (III-A).

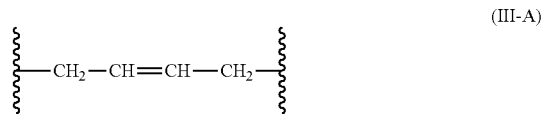

(III-A)

Embodiment 9 relates to the nitrogen-containing multi-block copolymer of Embodiment 7 or 8, wherein the B block further comprises repeat units of Formula (IV-B).

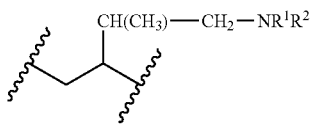

(IV-B)

In Formula (IV-B), group $R^1$ is hydrogen, alkyl, or aryl and $R^2$ is an alkyl or aryl. Alternatively, $R^1$ and $R^2$ together with the nitrogen to which they are both attached form a heterocyclic ring having 0 to 2 additional heteroatoms selected from nitrogen or oxygen. An asterisk (*) denotes the point of attachment of the pendant groups to a carbon atom in the polymeric backbone of the B block. The molar ratio of repeat groups of Formula (IV-A) to repeat units of Formula (IV-B) is at least 6 or at least 15. The repeat units of Formula (IV-B) have pendant groups of Formula (I-B).

*—CH(CH$_3$)—CH$_2$—NR$^1$R$^2$  (I-B)

Embodiment 10 relates to the nitrogen-containing multi-block copolymer of any one of Embodiments 1 to 8, wherein the B block comprises (a) 5 to 100 mole percent repeat units having pendant groups of Formula (I-A) (corresponding to the amino-functionalized repeat units of Formula (IV-A)) (b) 0 to 95 mole percent of repeat units of 1,4-butadiene (corresponding to repeat units of Formula (III-A)) and (c) 0 to 5 mole percent of repeat units of 1,2-butadiene (corresponding to repeat units of Formula (III-B)).

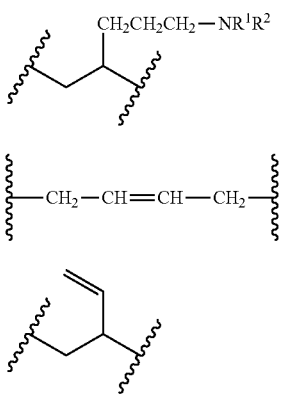

Embodiment 11 relates to the nitrogen-containing multi-block copolymer of Embodiment 10, further comprising repeat units having pendant groups of Formula (I-B) (corresponding to amino-functionalized repeat units of Formula (IV-B))

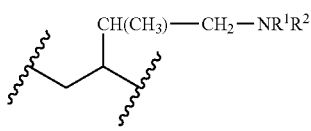

(IV-B)

wherein a molar ratio of the amino-functionalized repeat units of Formula (IV-A) to the amino-functionalized repeat units of Formula (IV-B) is at least 6 and wherein the nitrogen-containing multi-block copolymer comprises 5 to 100 mole percent of repeat units of Formula (IV-A) plus repeat units of Formula (IV-B).

Embodiment 12 relates to the nitrogen-containing multi-block copolymer of Embodiment 11 wherein the molar ratio is at least 15.

Embodiment 13 relates to the nitrogen-containing multi-block copolymer of any one of Embodiments 1 to 12, wherein the nitrogen-containing multi-block copolymer comprises 5 to 95 mole percent A block and 5 to 90 mole percent B block or 10 to 95 mole percent A block and 5 to 90 mole percent B block.

Embodiment 14 relates to the nitrogen-containing multi-block copolymer of any one of Embodiments 1 to 13, further comprising a C block different than the A and B blocks.

Embodiment 15 relates to the nitrogen-containing multi-block copolymer of Embodiment 14, wherein the C block comprises a polymeric material formed from a styrene-type monomer, wherein styrene-type monomers comprise styrene and alkyl substituted styrene.

Embodiment 16 relates to the nitrogen-containing multi-block copolymer of any one of Embodiments 1 to 15, wherein the nitrogen-containing multi-block copolymer comprises 0 to 90 mole percent styrene-type repeat units (corresponding to 0 to 90 mole percent C block).

Embodiment 17 relates to the nitrogen-containing multi-block copolymer of any one of Embodiments 1 to 16, wherein the nitrogen-containing multi-block copolymer comprises 5 to 95 mole percent A block, 5 to 90 mole percent B block, and 0 to 70 mole percent C block.

Embodiment 18 relates to the nitrogen-containing multi-block copolymer of any one of Embodiments 1 to 17, wherein the nitrogen-containing multi-block copolymer comprises 20 to 90 mole percent A block, 5 to 50 mole percent B block, and 0 to 70 mole percent C block.

Embodiment 19 relates to the nitrogen-containing multi-block copolymer of any one of Embodiments 1 to 18, wherein the nitrogen-containing multi-block copolymer comprises 50 to 80 mole percent A block, 10 to 40 mole percent B block and 0 to 30 mole percent C block.

Embodiment 20 relates to the nitrogen-containing multi-block copolymer of any one of Embodiments 1 to 19, wherein the nitrogen-containing multi-block copolymer has a weight average molecular weight of at least 5000 Daltons.

Embodiment 21 relates to the nitrogen-containing multi-block copolymer of any one of Embodiments 1 to 20, wherein the nitrogen-containing multi-block copolymer is an AB, ABA, BAB, ABC, ACB, CAB, CABC, CABAC, ACBCA, ABCBA, ACAB, CACB, BCBA, or CBCA multi-block copolymer, wherein each A is an A block, each B is a B block, and each C is a C block.

Embodiment 22 relates to an article comprising the nitrogen-containing multi-block copolymer of any one of Embodiments 1 to 21.

Embodiment 23 relates to the article of Embodiment 22, further comprising a substrate comprising a first major surface and a second major surface, the nitrogen-containing block copolymer positioned adjacent to at least one of the first major surface and the second major surface.

Embodiment 24 relates to a method for making a nitrogen-containing multi-block copolymer comprising:
providing or obtaining a precursor multi-block copolymer comprising
at least one first polymeric block comprising polyisoprene; and
at least one second block comprising polybutadiene, wherein the polybutadiene has pendant vinyl groups of formula *—CH=CH$_2$ and wherein an asterisk (*)

denotes the point of attachment of each pendant group to a carbon atom in the polymeric backbone; and hydroformylating and reductively aminating the precursor multi-block copolymer in the presence of at least one transition metal catalyst to form the nitrogen-containing multi-block copolymer, wherein then the nitrogen-containing multi-block copolymer comprises
at least one A block comprising polyisoprene; and
at least one B block comprising an amino-functionalized polybutadiene having pendant groups of Formula (I-A) and Formula (I-B)

(I-A)

(I-B)

wherein
$R^1$ is hydrogen, alkyl, or aryl and $R^2$ is an alkyl or aryl; or
$R^1$ and $R^2$ together with the nitrogen to which they are both attached form a heterocyclic ring having 0 to 2 additional heteroatoms selected from nitrogen or oxygen.

Embodiment 25 relates to the method of Embodiment 24, wherein the at least one B block comprising amino-functionalized polybutadiene further comprises pendant groups of Formula (I-B)

(I-B).

Embodiment 26 relates to the method of Embodiment 25 having a molar ratio of pendant groups of Formula (I-A) to pendant groups of Formula (I-B) of at least 6 or at least 15.

Embodiment 27 relates to the method of any one of embodiment 24 to 26, wherein the precursor multi-block copolymer comprises 5 to 95 mole percent isoprene repeat units. The amount is based on the total moles of repeat units in the precursor nitrogen-containing copolymer.

Embodiment 28 relates to the method of any one of Embodiments 24 to 27, wherein the precursor multi-block copolymer comprises 5 to 90 mole percent butadiene repeat units. The amount is based on the total moles of repeat units in the precursor multi-block copolymer.

Embodiment 29 relates to the method of any one of Embodiments 24 to 28, wherein the second polymeric block of the precursor multi-block copolymer comprises 5 to 100 mole percent 1,2-butadiene repeat units of Formula (III-B) and 0 to 95 mole percent 1,4-butadiene repeat units of Formula (III-A).

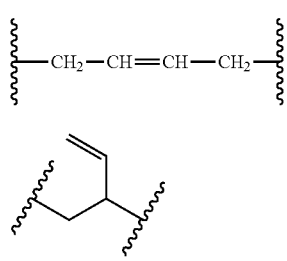

(III-A)

(III-B)

Embodiment 30 relates to the method of any one of Embodiments 24 to 29, wherein the precursor multi-block copolymer further comprises a third polymeric block formed from a styrene-type monomer, wherein styrene-type monomers comprise styrene and alkyl substituted styrene.

Embodiment 31 relates to the method of Embodiment 30, wherein the precursor multi-block copolymer comprises 0 to 70 mole percent styrene-type repeat units. The amount is based on the total moles of repeat units in the precursor multi-block copolymer.

Embodiment 32 relates to the method of any one of Embodiments 24 to 31, wherein the precursor multi-block copolymer comprises 5 to 95 mole percent isoprene repeat units, 5 to 90 mole percent butadiene repeat units, and 0 to 70 mole percent styrene-type repeat units.

Embodiment 33 relates to the method of any one of embodiments 24 to 32, wherein the precursor multi-block copolymer comprises 20 to 90 mole percent isoprene repeat units, 5 to 50 mole percent butadiene repeat units, and 0 to 70 mole percent styrene-type repeat units.

Embodiment 34 relates to the method of any one of embodiments 24 to 33, wherein the precursor multi-block copolymer comprises 50 to 80 mole percent isoprene repeat units, 10 to 40 mole percent butadiene repeat units, and 0 to 30 mole percent styrene-type repeat units.

Embodiment 35 relates to the method of any one of Embodiments 24 to 34, wherein hydroformylating and reductively aminating the precursor multi-block copolymer comprises:
forming a reaction mixture comprising:
the precursor multi-block copolymer dissolved in an organic solvent;
an amine compound of formula $NHR^1R^2$ ($R^1$ and $R^2$ are defined in Embodiment 23);
at least one transition metal catalyst;
an optional phosphine compound; and
exposing the reaction mixture to a gaseous mixture of carbon monoxide and hydrogen.

Embodiment 36 relates to the method of Embodiment 35, wherein the at least one transition metal catalyst is at least one of a ruthenium catalyst and a rhodium catalyst.

Embodiment 37 relates to the method of Embodiment 36, wherein the ruthenium catalyst is a ruthenium carbonyl catalyst.

Embodiment 38 relates to the method of Embodiment 37, wherein the ruthenium carbonyl catalyst is $Ru_3(CO)_{12}$.

Embodiment 39 relates to the method of Embodiment 36, wherein the rhodium catalyst is a rhodium carbonyl catalyst.

Embodiment 40 relates to the method of Embodiment 38, wherein the rhodium carbonyl catalyst is $(acac)Rh(CO)_2$.

Embodiment 41 relates to the method of any one of Embodiments 35 to 40, wherein the phosphine compound is of the Formula (V)

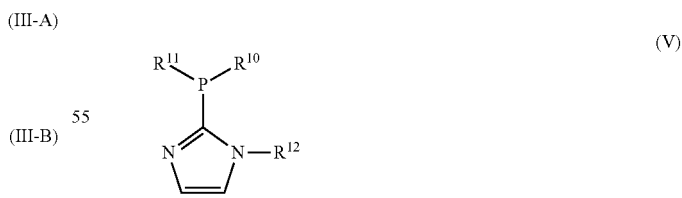

(V)

wherein
$R^{10}$ and $R^{11}$ are each independently an alkyl or aryl; and
$R^{12}$ is an aryl or an aryl substituted with at least one alkyl or alkoxy group.

Embodiment 42 relates to the method of any one of Embodiments 35 to 41, further comprising exposing a product of the reaction mixture to hydrogenation without the addition of another catalyst.

Embodiment 43 relates to the method of any one of Embodiments 24 to 42, wherein the nitrogen-containing multi-block copolymer is any one of Embodiments 1 to 23.

Embodiment 44 is a nitrogen-containing copolymer that is formed using the method of any one of Embodiments 24 to 42.

Embodiment 45 is an article comprising the nitrogen-containing block copolymer of any one of Embodiments 1 to 23.

EXAMPLES

Advantages and embodiments of this disclosure are further illustrated by the following examples, but the materials and amounts thereof recited in these examples, as well as other conditions and details, should not be construed to unduly limit this invention. In these examples, all percentages, proportions and ratios are by weight unless otherwise indicated.

Unless otherwise indicated, all other reagents were obtained, or are available from fine chemical vendors such as Sigma-Aldrich Company, St. Louis, Mo., or may be synthesized by known methods. Table 1 (below) lists materials used in the examples and their sources.

TABLE 1

| DESIGNATION | DESCRIPTION | SOURCE |
| --- | --- | --- |
| Toluene | Anhydrous, 99.8% | Sigma-Aldrich, St. Louis, Missouri |
| Morpholine | 99% | Alfa Aesar, Ward Hill, Massachusetts |
| Isopropylamine | >99.5% | Sigma-Aldrich |
| THF | Tetrahydrofuran, anhydrous, ≥99.9%, inhibitor-free | Sigma-Aldrich |
| Cyclohexane | Anhydrous | Sigma-Aldrich |
| Silica Gel | Silica Gel, 60 Angstrom, 200-425 mesh | Sigma-Aldrich |
| Methanol | Anhydrous, 99.8% | Sigma-Aldrich |
| Isoprene | 2-methyl-1,3-butadiene | Alfa Aesar |
| Sec-butyllithium | 12 wt % sBuLi in cyclohexane | FMC Lithium, Charlotte, North Carolina |
| Di-n-butylmagnesium | 1.0M in heptane | Sigma-Aldrich |
| Anhydrous methanol | Anhydrous methanol obtained under the trade designation OMNISOLV MX0480-6 | EMD Millipore, Burlington Massachusetts |
| DPE | 1,1-Diphenylethylene, 98% | Alfa Aesar |
| n-butyllithium | 24 wt % n-butyllithium in hexanes | FMC Lithium |
| Calcium hydride | Calcium hydride | Sigma-Aldrich |
| Isopropanol | Isopropyl alcohol | VWR, Radnor Pennsylvania |
| Butadiene | 1,3-butadiene | Sigma-Aldrich |
| PICy | 1-(2,4,6-Trimethylphenyl)-2(dicyclohexyl-phosphino)imidazole | Strem Chemicals Inc., Newburyport, Massachusetts |
| $Ru_3(CO)_{12}$ | Ruthenium carbonyl | Strem Chemicals Inc. |
| Deuterated Benzene | Benzene-D6 (D, 99.5%) | Cambridge Isotope Laboratories, Inc., Andover, Massachusetts |
| Deuterated Chloroform | Chloroform-D (D, 99.8%) | Cambridge Isotope Laboratories |

Test Methods
Gel Permeation Chromatography (GPC)

The solvent and eluent consisted of tetrahydrofuran (THF, stabilized with 250 parts per million (ppm) butylated hydroxytoluene (BHT)) modified with 5% v/v trimethylamine. Solutions of known concentration (target 2-5 milligrams per milliliter (mg/mL)) were prepared in the solvent in glass scintillation vials. The vials were swirled for at least 4 hours to allow dissolution. The solutions were filtered through 0.45 micrometer polytetrafluoroethylene (PTFE) syringe filters and analyzed by GPC.

GPC conditions:
Instrument: Agilent 1260 LC
Column set: Waters STYRAGEL HR 5E, 300×7.8 millimeter (mm) inner diameter
Column Heater: 40° C.
Mobile phase: THF (stabilized with 250 ppm BHT) at 1.0 milliliters/minute
Injection volume: 30 microliters
Detector (s): Wyatt DAWN HELEOS-II 18 angle Light Scattering detector Wyatt VISCOSTAR II viscometer detector Wyatt OPTILAB T-rEX Differential Refractive Index (DRI) detector ASTRA 6 from Wyatt Technology Corporation (Goleta, California) was used for data collection and analysis. The refractive index increment (dn/dc) of each sample was experimentally determined in the mobile phase (THF) using a Total Recovery Approach (Podzimek, Stepan. Light Scattering, Size Exclusion Chromatography and Asymmetric Flow Field Flow Fractionation: Powerful Tools for the Characterization of Polymers, Proteins and Nanoparticles. John Wiley & Sons, Inc.: Hoboken, N.J., 2011, pp 65-72).

Nuclear Magnetic Resonance (NMR)

A portion of the polymer sample was analyzed as a solution of unknown concentration (generally approximately 12 mg/mL) in dry deuterated benzene or chloroform. NMR spectra were acquired on a Bruker AVANCE 600 MHz NMR spectrometer equipped with an inverse cryoprobe. 2D-NMR spectra (Heteronuclear Single Quantum Coherence-Total Correlation Spectroscopy, HSQC-TOCSY), 13C-NMR, and $^1$H-NMR were acquired for catalyst selectivity studies and n- vs. iso-aminomethylated resonance assignments.

General Considerations

Polymer synthesis and reagent manipulations were conducted in a MBraun Labmaster SP glovebox or in custom glassware designed to enable anionic polymerizations (for examples see Ndoni, S.; Papadakis, C. M.; Bates, F. S.; Almdal, K., Laboratory-scale Setup for Anionic Polymerization under Inert Atmosphere. Review of Scientific Instruments 1995, 66 (2), 1090-1095). Standard air-free techniques were used for reagent manipulations.

Solvents, monomers, and reagents used for the anionic polymerization of block polymers were purified to be rigorously free of air, moisture, and protic impurities prior to use. Cyclohexane solvent (approximately 0.8 Liters (L)) was mixed with a small amount of DPE (0.2 milliliters (mL)) in a Schlenk flask as degassed by bubbling argon gas through the mixture for at least 60 minutes before n-butyllithium (3 mL, hexanes solvent removed in vacuo) was added under argon counterflow via a syringe. The flask was then sealed and stirred for at least 24 hours before the purified solvent was vacuum transferred to a flame dried flask. Alternatively, cyclohexane solvent was purified via solvent purification system (Pure Process Technology, LLC, Nashua, N.H.). THF used during anionic polymerizations was purified via solvent purification system (Pure Process Technology, LLC) collected in a flask containing n-butyllithium (3 mL, hexanes solvent removed in vacuo) and vacuum transferred to a receiving flask prior to use. Isoprene was degassed by repeated freeze-pump-thaw cycles, vacuum transferred to a flask containing di-n-butylmagnesium (solvent removed in vacuo) and stirred for 45 minutes, vacuum transferred to a second flask containing di-n-butylmagnesium (solvent removed in vacuo) and stirred for at least an additional 45 minutes before collecting the purified monomer in a flask by vacuum transfer. Butadiene was condensed in a flask containing n-butyllithium (solvent removed in vacuo) cooled in liquid nitrogen, thawed in an ice water bath at 0° C. and stirred for 30 minutes, vacuum transferred to a second flask containing n-butyllithium (solvent removed in vacuo) and stirred for an additional 30 minutes at 0° C. before collecting the purified monomer in a flask by vacuum transfer. Deuterated benzene used for 2D NMR experiments was dried by stirring over calcium hydride before being vacuum transferred to a Schlenk flask.

Preparatory Example 1 (PE-1): Synthesis of (1,4-PI)-b-(1,2-PB) Block Copolymer by Sequential Anionic Polymerization

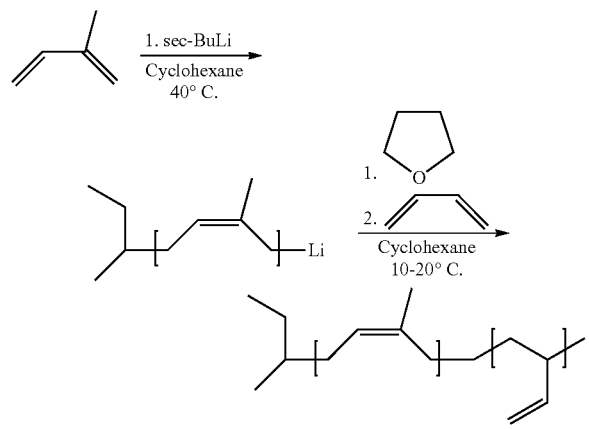

Generally, polyisoprene-block-1,2-polybutadiene diblock copolymer is prepared through sequential anionic polymerization of isoprene followed by butadiene with the inclusion of a polar additive (THF) with the butadiene addition. A representative experimental procedure for the synthesis of Preparatory Example 1 (PE-1) follows.

A 2 L polymerization reactor apparatus was constructed and inert argon atmosphere established. 486 grams (g) of purified cyclohexane was added to the reactor and the reactor was heated to 40° C. via a water bath. Sec-butyllithium initiator (3.5 mL; nominally 5.2 millimole (mmol)) was then added to the reactor and stirred for 30 minutes. Purified isoprene (34.4 g) was then added to the reactor. After reacting for approximately 16 hours, the reactor was cooled to approximately 15° C. via a water bath. Purified THF (42 mL; 520 mmol) was added to the reactor via a gastight syringe. Purified butadiene (18.5 g) was added to the reactor and the reactor was then allowed to slowly warm to room temperature (temperature control was ceased). Approximately 16 hours after the addition of butadiene, the reaction was terminated with degassed anhydrous methanol. The polymer was isolated by precipitating the reaction mixture in a 2:1 methanol: isopropanol ratio by volume mixture, decanting off the solvent, and drying the polymer in a vacuum oven. Polymer composition was determined by $^{1}$H-NMR and polymer molecular weight and dispersity (PDI) was determined by GPC analysis.

These reaction conditions, more specifically, utilizing a hydrocarbon solvent for the polymerization of the polyisoprene block and adding THF as a polar additive before adding the butadiene monomer to polymerize the butadiene block, resulted in a polyisoprene (PI) block with a high incorporation of 1,4-isoprene (1,4-PI) repeat units (93 mole percent in PE-1, 93 mol percent in PE-2) and a polybutadiene (PB) block with high incorporation of 1,2-butadiene (1,2-PB) repeat units (89 mole percent in PE-1, 89 mole percent in PE-2). Molecular characteristics of the synthesized polymer is summarized in Table 2.

TABLE 2

| EXAMPLE | $M_w$, kg/mol* | PDI** | PB, wt % | PI, wt % |
|---|---|---|---|---|
| PE-1 | 12.1 | 1.02 | 33 | 67 |
| PE-2 | 11.8 | 1.20 | 28 | 72 |

*$M_w$ = weight average molecular weight determined by GPC Analysis
**Dispersity (PDI) determined by GPC Analysis Example 1 (EX-1): Aminomethylation of (1,4-PI)-b-(1,2-PB) Block Copolymer with Morpholine PI-PB (PE-1, 50.0 g), toluene (470 mL), methanol (100 mL), PICy (360 mg, 0.941 mmol), $Ru_3(CO)_{12}$ (175 mg, 0.821 mmol Ru), and morpholine (35 mL) were added to a 2 L Parr reactor equipped with glass liner. The reactor was sealed and a syngas atmosphere was established with three cycles of pressurization to 200 pounds per square inch (psi) and venting with syngas ($H_2$/CO, 3:1). Once purged, the reactor was pressurized to 600 psi with syngas. The contents of the reactor were stirred for 5 hours before heating was initiated. The reaction was heated to 130° C. and heating was maintained for 48 hours while under 800 psi syngas pressure. Heating was then discontinued, and the reactor was cooled and vented. A hydrogen atmosphere was then established with two cycles of pressurization and purging with hydrogen. The reactor was then pressurized to 600 psi with hydrogen before being heated to 130° C. for 12 hours at 800 psi hydrogen.

The reactor was then cooled and vented. A light orange/yellow homogeneous solution was obtained. The solution was reduced to dryness on a rotovap before 800 mL cyclohexane was added to re-dissolve the viscous polymer. Once dissolved, the solution was filtered through silica gel to afford a pale yellow filtrate. The filtrate was reduced to dryness under vacuum to afford a viscous, light yellow wax. The reaction product was characterized by GPC and NMR.

The aminomethylated diblock copolymer was analyzed by GPC to determine molecular weight after functionalization and the effect of the aminomethylation reaction on the molecular weight distribution of the polymer (Table 3). NMR experiments were done to assess the selectivity of the aminomethylation reaction. NMR results are summarized in Table 4.

TABLE 3

| EXAMPLE | $M_n$, kg/mol* | $M_w$, kg/mol** | PDI*** | Comment |
|---|---|---|---|---|
| PE-1 | 11.9 | 12.1 | 1.02 | Precursor diblock |
| EX-1 | 19.3 | 20.4 | 1.06 | Aminomethylated diblock |

*$M_n$ = number average molecular weight determined by GPC Analysis
**$M_w$ = weight average molecular weight determined by GPC Analysis
***Dispersity (PDI) determined by GPC Analysis

TABLE 4

| EX. | 1,4-isoprene repeat units | 3,4-isoprene repeat units | 1,4-butadiene repeat units | 1,2-butadiene repeat units | 1,2-n-morpholine repeat units | Butadiene-Isoprene rearrangement | Extended conjugation |
|---|---|---|---|---|---|---|---|
| Mole % | | | | | | | |
| PE-1 | 57.1% | 4.3% | 4.1% | 34.5% | 0.0% | 0.0% | 0.0% |
| EX-1 | 54.0% | 4.0% | 3.6% | 0.0% | 31.7% | 6.2% | 0.6% |
| Weight % | | | | | | | |
| PE-1 | 62.0% | 4.7% | 3.6% | 29.7% | 0.0% | 0.0% | 0.0% |
| EX-1 | 38.6% | 2.8% | 2.1% | 0.0% | 51.7% | 4.5% | 0.4% |

The NMR results indicate the aminomethylation reaction is highly selective for n- (as opposed to iso-) addition to the 1,2-butadiene repeat units and does not add in any measurable amount to the 1,4-butadiene repeat units or any of the polyisoprene repeat units of any microstructure. Complete conversion of the 1,2-butadiene repeat units to the amino-functionalized 1,2-n-morpholine repeat units was observed. A small amount of backbone double bond rearrangement was detected.

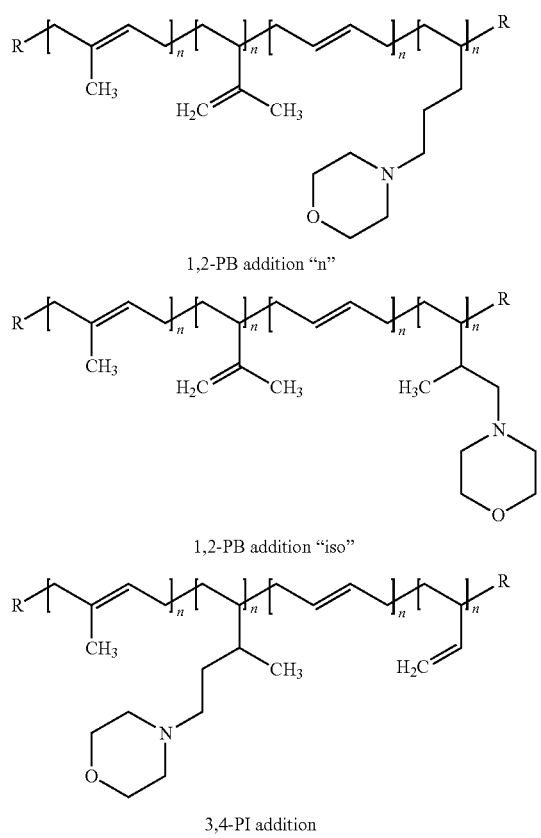

1,2-PB addition "n"

1,2-PB addition "iso"

3,4-PI addition

GPC results indicate an increase in molecular weight consistent with the increase in molar mass expected from the complete functionalization of 1,2-butadiene repeat units with morpholine. There is minimal change to the narrow molecular weight distribution of the block copolymer upon aminomethylation, indicating an absence of significant unfavorable crosslinking or chain scission side reactions.

Example 2 (EX-2): Aminomethylation of (1,4-PI)-b-(1,2-PB) Block Copolymer with Isopropylamine PE-2 (60.0 g), toluene (450 mL), methanol (100 mL), PICy (317 mg, 0.830 mmol), $Ru_3(CO)_{12}$ (177 mg, 0.830 mmol Ru), and isopropylamine (68 mL) were added to a 2 L Parr reactor equipped with glass liner. The reactor was sealed and a syngas atmosphere was established with three cycles of pressurization to 200 pounds per square inch (psi) and venting with syngas ($H_2$/CO, 3:1). Once purged, the reactor was pressurized to 600 psi with syngas. The contents of the reactor were stirred for 5 hours before heating was initiated. The reaction was heated to 130° C. and heating was maintained for 48 hours while under 800 psi syngas pressure. Heating was then discontinued, and the reactor was cooled and vented. A hydrogen atmosphere was then established with two cycles of pressurization and purging with hydrogen. The reactor was then pressurized to 600 psi with hydrogen before being heated to 130° C. for 12 hours at 800 psi hydrogen.

The reactor was then cooled and vented. An orange, homogeneous solution with viscosity similar to the initial reaction solution was obtained. The solution was reduced to dryness on a rotovap before 800 mL cyclohexane was added to re-dissolve the viscous polymer. Once dissolved, the solution was filtered through silica gel to afford a pale, yellow filtrate. The filtrate was reduced to dryness under vacuum to afford a viscous, yellow oil. The reaction product was characterized by $^1$H-NMR.

The FIGURE is a comparison of the $^1$H-NMR for PE-2 (dashed) and EX-2 (solid). The spectra are displayed slightly offset for clarity. Resonances corresponding to 1,4-polyisoprene (at about 5.1 ppm) and for 1,2-polyisoprene and/or 3,4-polyisoprene (in a range of about 4.5 to 4.75 ppm) are substantially conserved after aminomethylation.

What is claimed is:

1. A nitrogen-containing multi-block copolymer comprising:
    at least one A block comprising polyisoprene having isoprene repeat units and wherein no more than 1 mole percent of the isoprene repeat units are aminated; and
    at least one B block comprising amino-functionalized polybutadiene, the amino-functionalized polybutadiene comprising pendant groups of Formula (I-A)

$$*-CH_2CH_2CH_2-NR^1R^2 \qquad \text{(I-A)}$$

wherein
    $R^1$ is hydrogen, alkyl, or aryl and $R^2$ is an alkyl or aryl;
    or R¹ and R² together with the nitrogen to which they are both attached form a heterocyclic ring having 0 to 2 additional heteroatoms selected from nitrogen or oxygen; and an asterisk (*) denotes the point of attachment of the pendant groups to a carbon atom in the polymeric backbone.

2. The nitrogen-containing multi-block copolymer of claim 1, wherein the at least one B block comprising amino-functionalized polybutadiene further comprises pendant groups of Formula (I-B)

   (I-B)

wherein a mole ratio of the pendant groups of Formula (I-A) to the pendant groups of Formula (I-B) is at least 6.

3. The nitrogen-containing multi-block copolymer of claim 2, wherein the mole ratio of the pendant groups of Formula (I-A) to the pendant groups of Formula (I-B) is at least 15.

4. The nitrogen-containing multi-block copolymer of claim 1, wherein the nitrogen-containing multi-block copolymer comprises 5 to 95 mole percent A block and 5 to 90 mole percent B block based on total moles of repeat units in the nitrogen-containing multi-block.

5. The nitrogen-containing multi-block copolymer of claim 4, wherein the nitrogen-containing multi-block copolymer further comprises 0 to 70 mole percent C block based on total moles of repeat units in the nitrogen-containing multi-block copolymer, wherein the C block is formed from styrene-type monomers comprising styrene, alkyl substituted styrene, or mixtures thereof.

6. The nitrogen-containing multi-block copolymer of claim 5, wherein the nitrogen-containing multi-block copolymer comprises 20 to 90 mole percent A block, 5 to 50 mole percent B block, and 0 to 70 mole percent C block.

7. The nitrogen-containing multi-block copolymer of claim 6, wherein the nitrogen-containing multi-block copolymer comprises 50 to 80 mole percent A block, 10 to 40 mole percent B block, and 0 to 30 mole percent C block.

8. The nitrogen-containing multi-block copolymer of claim 1, wherein the B block comprises (a) repeat units of Formula (IV-A) having the pendant groups of Formula (I-A) and (b) optional repeat units of the Formula (III-A)

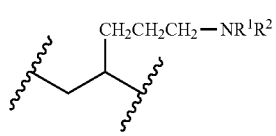   (IV-A)

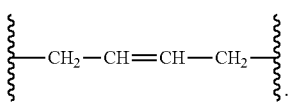   (III-A)

9. The nitrogen-containing multi-block copolymer of claim 8, wherein the B block comprises 5 to 100 mole percent amino-functionalized repeat units of Formula (IV-A) and 0 to 95 mole percent repeat units of Formula (III-A)

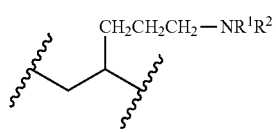   (IV-A)

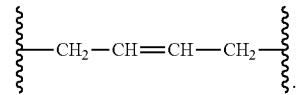   (III-A)

10. The nitrogen-containing multi-block copolymer of claim 9, wherein the B block comprises 5 to 100 mole percent amino-functionalized repeat units of Formula (IV-A) and of Formula (IV-B), wherein the mole ratio of moles of repeat units of Formula (IV-A) to moles of repeat units of Formula (IV-B) is at least 6, 0 to 95 mole percent repeat units of Formula (III-A), and 0 to 5 mole percent repeat units of Formula (III-B)

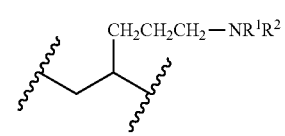   (IV-A)

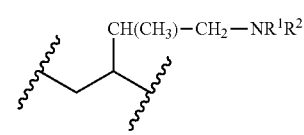   (IV-B)

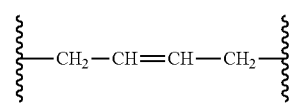   (III-A)

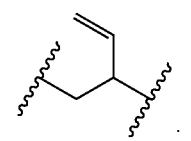   (III-B)

11. The nitrogen-containing multi-block copolymer of claim 6, wherein the nitrogen-containing multi-block copolymer is an AB, ABA, BAB, ABC, ACB, CAB, CABC, CABAC, ACBCA, ABCBA, ACAB, CACB, BCBA, or CBCA multi-block copolymer, wherein each A is an A block, each B is a B block, and each C is a C block.

12. An article comprising the nitrogen-containing multi-block copolymer of claim 1.

13. A method for making a nitrogen-containing multi-block copolymer comprising:
providing or obtaining a precursor multi-block copolymer comprising
  at least one A block comprising polyisoprene; and
  at least one B block comprising polybutadiene, wherein the polybutadiene has pendant vinyl groups of formula *—CH=CH₂ and wherein an asterisk (*) denotes the point of attachment of each pendant group to a carbon atom in the polymeric backbone; and
hydroformylating and reductively aminating the precursor multi-block copolymer in the presence of at least one transition metal catalyst to form the nitrogen-containing multi-block copolymer, wherein then the nitrogen-containing multi-block copolymer comprises
  at least one A block comprising polyisoprene having isoprene repeat units and wherein no more than 1 mole percent of the isoprene repeat units are aminated; and at least one B block comprising an amino-functionalized polybutadiene having pendant groups of Formula (I-A)

*—CH$_2$CH$_2$CH$_2$—NR$^1$R$^2$  (I-A)

wherein
R$^1$ is hydrogen, alkyl, or aryl and R$^2$ is an alkyl or aryl; or
R$^1$ and R$^2$ together with the nitrogen to which they are both attached form a heterocyclic ring having 0 to 2 additional heteroatoms selected from nitrogen or oxygen.

14. The method of claim 13, wherein the amino-functionalized butadiene further comprises pendant groups of Formula (I-B)

*—CH(CH$_3$)—CH$_2$—NR$^1$R$^2$  (I-B)

wherein a mole ratio of the pendant groups of Formula (I-A) to the pendant groups of Formula (I-B) is at least 6.

15. The method of claim 13, wherein hydroformylating and reductively aminating the precursor multi-block copolymer comprises:
forming a reaction mixture comprising:
a) the precursor multi-block copolymer dissolved in an organic solvent;
b) an amine compound of formula NHR$^1$R$^2$;
c) at least one transition metal catalyst;
d) an optional phosphine compound; and
exposing the reaction mixture to a gaseous mixture of carbon monoxide and hydrogen.

* * * * *